United States Patent
Sparks

(10) Patent No.: US 8,528,178 B2
(45) Date of Patent: Sep. 10, 2013

(54) BRISTLE AND PLATE SUBASSEMBLY FIXTURE AND MANUFACTURING METHOD

(75) Inventor: Glenn D. Sparks, Saco, ME (US)

(73) Assignee: United Technologies Corporation, Hartford, CT (US)

( * ) Notice: Subject to any disclaimer, the term of this patent is extended or adjusted under 35 U.S.C. 154(b) by 1472 days.

(21) Appl. No.: 12/041,031

(22) Filed: Mar. 3, 2008

(65) Prior Publication Data
US 2009/0218771 A1   Sep. 3, 2009

(51) Int. Cl.
*B23Q 3/00* (2006.01)

(52) U.S. Cl.
USPC .......................................... 29/281.1; 29/235

(58) Field of Classification Search
USPC ................... 29/281.1, 235, 281.4, 281.5, 559; 277/335; 300/18, 21
See application file for complete search history.

(56) References Cited

U.S. PATENT DOCUMENTS

| | | | |
|---|---|---|---|
| 4,678,113 A | 7/1987 | Bridges et al. | |
| 4,884,850 A * | 12/1989 | Greer | 300/21 |
| 4,989,919 A | 2/1991 | Greer | |
| 5,715,596 A | 2/1998 | Bintz | |
| 5,776,389 A | 7/1998 | Chaudhary | |
| 6,390,476 B1 * | 5/2002 | Tong et al. | 277/355 |
| 6,805,356 B2 | 10/2004 | Inoue | |
| 7,000,923 B2 | 2/2006 | Addis | |
| 7,181,843 B1 | 2/2007 | Tabbita et al. | |
| 7,226,054 B2 | 6/2007 | Addis | |
| 7,270,333 B2 | 9/2007 | Addis | |
| 7,340,816 B2 * | 3/2008 | Szymbor et al. | 29/467 |
| 7,931,276 B2 * | 4/2011 | Szymbor et al. | 277/355 |
| 2003/0062684 A1 * | 4/2003 | Inoue | 277/355 |
| 2005/0285346 A1 | 12/2005 | Szymbor et al. | |
| 2007/0214628 A1 | 9/2007 | Adis et al. | |
| 2009/0218771 A1 * | 9/2009 | Sparks | 277/355 |

FOREIGN PATENT DOCUMENTS

| | | |
|---|---|---|
| EP | 0357536 | 3/1990 |
| EP | 1 335 157 A2 | 8/2003 |
| GB | 2 022 197 A | 12/1979 |

OTHER PUBLICATIONS

European Search Report for EP Application No. 09250560.1, Jun. 29, 2009.
EP Search Report dated Apr. 5, 2013 for application No. 13150518.2-1754.

* cited by examiner

*Primary Examiner* — Lee D Wilson
(74) *Attorney, Agent, or Firm* — Carlson, Gaskey & Olds, P.C.

(57) ABSTRACT

A method of manufacturing a brush seal assembly is disclosed. The method includes circumferentially arranging bristles about an axis. A plate is arranged adjacent to the bristles. Unwelded ends of the bristles are aligned with a periphery of the plate to provide a flush surface across plate and bristles. The unwelded ends are laser welded to the periphery at the flush surface to provide a unitary subassembly.

8 Claims, 3 Drawing Sheets

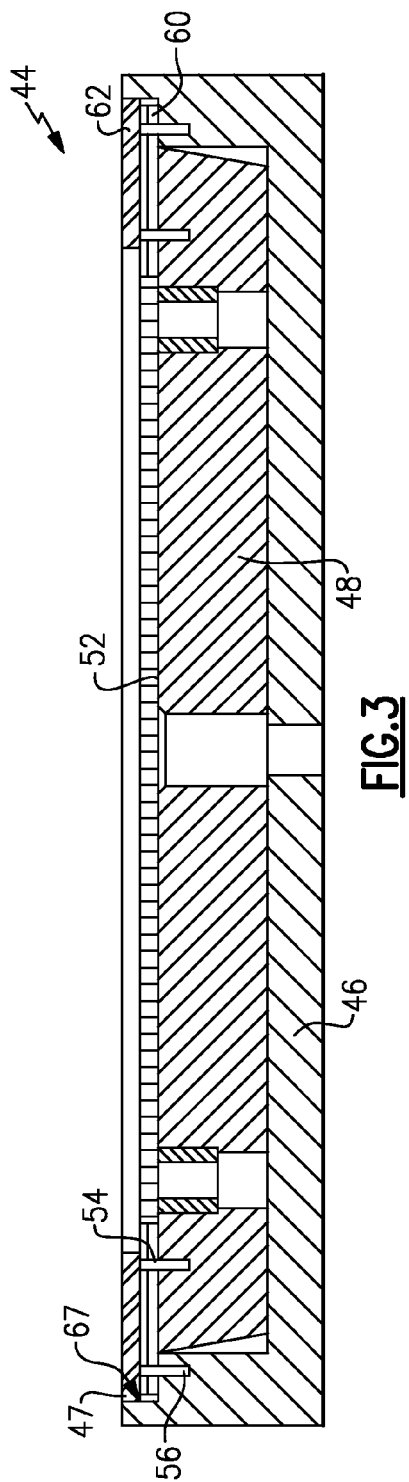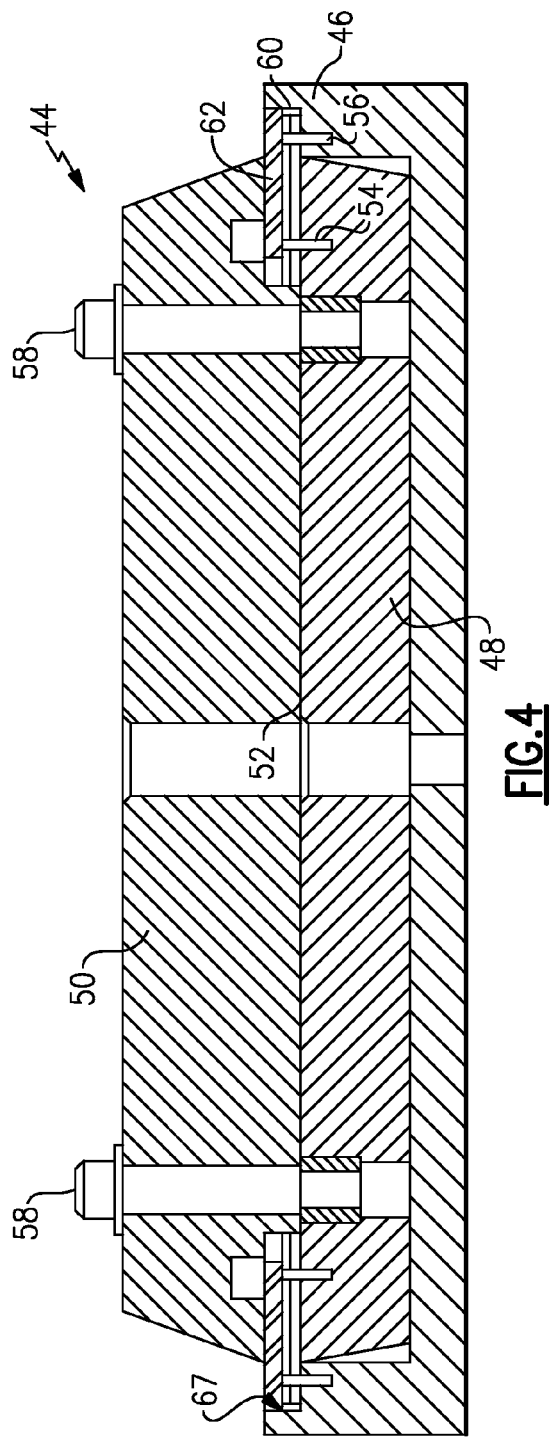

BRISTLE AND PLATE SUBASSEMBLY FIXTURE AND MANUFACTURING METHOD

BACKGROUND

This disclosure relates to a brush seal assembly. More particularly, the disclosure relates to a method of securing bristles to a plate.

Brush seals are widely used to seal rotating structures. For example, the use of brush seals are prevalent in gas turbine engines. Typical brush seal manufacturing methods require numerous steps during which various components are welded to one another, which greatly impacts the manufacturing time and cost of the brush seal.

A brush seal typically includes at least three components: a bristle assembly or hoop and first and second plates arranged on either side of the bristle assembly. The plates and bristle assembly are joined to one another by various welds. One typical manufacturing process includes arranging the bristles in a fixture and securing a periphery of the bristles using a weld bead to provide the bristle assembly. The weld bead must then be machined to provide a smooth surface for subsequent welding operations. The machined bristle assembly is arranged between the plates and a weld bead is applied across the machined periphery and adjoining surfaces of the plates.

Typically, the components of the brush seal are tungsten inert gas (TIG) manually welded by a highly skilled welder. Automated laser welding, although suggested in the prior art, cannot be used because the machined surface of the bristle assembly must run true to the adjoining surface on the detail, which it does not. If adjoining surfaces are not true to one another, then porosity results in the weld when laser welding is employed, which renders the brush seal scrap. Moreover, since the orientation of the bristles is directional, the bristle assembly has been oriented and secured incorrectly relative to the plates, which renders the brush seal scrap.

What is needed is a brush seal manufacturing process that enables the use of automated laser welding and prevents improper orientation of the bristle assembly.

SUMMARY

A method of manufacturing a brush seal assembly is disclosed. The method includes circumferentially arranging bristles about an axis. A plate is arranged adjacent to the bristles. Unwelded ends of the bristles are aligned with a periphery of the plate to provide a flush surface across the plate and bristles. The unwelded ends are laser welded to the periphery at the flush surface to provide a unitary subassembly.

These and other features of the application can be best understood from the following specification and drawings, the following of which is a brief description.

BRIEF DESCRIPTION OF THE DRAWINGS

FIG. 3 is a cross-sectional view of a base and shuttle supporting bristles and a plate.

FIG. 4 is a cross-sectional view similar to FIG. 3 with a cover installed to provide an assembled brush seal fixture.

DETAILED DESCRIPTION

Figure 1:
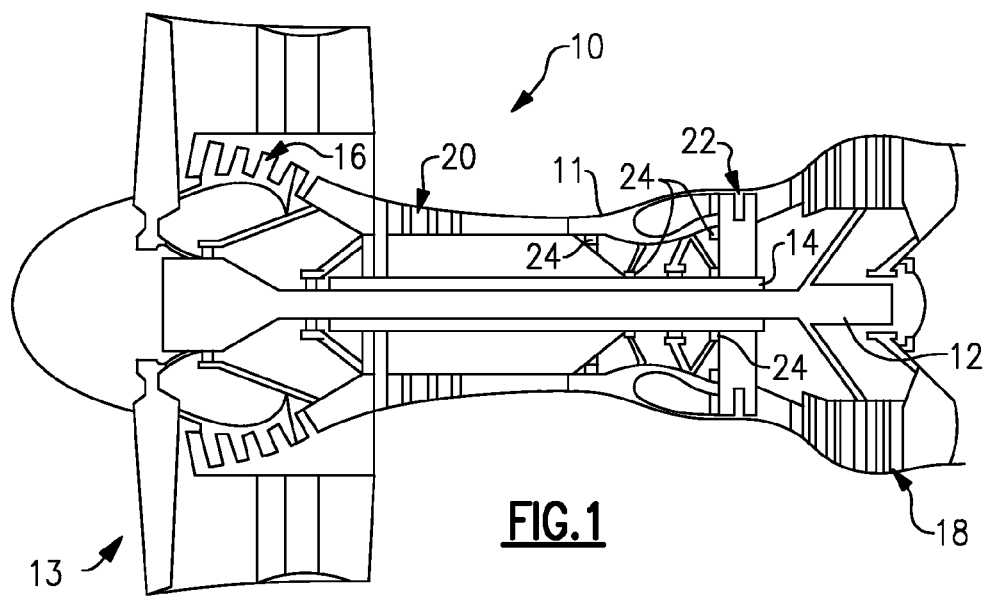
FIG. 1 is a highly schematic view of an example gas turbine engine.

A gas turbine engine 10 is schematically shown in FIG. 1. The engine 10 includes a low spool 12 and a high spool 14 coaxial with one another for rotation about a common axis. A low pressure compressor 16 and low pressure turbine 18 are mounted on the low spool 12. A high pressure compressor section 20 and a high pressure turbine section 22 are mounted on the high spool 14. A fan 13 is coupled to the low spool 12. The spools 12, 14 and compressor and turbine sections 16, 18, 20 and 22 are mounted within a case 11. Various rotating structures are sealed relative to the case 11 with seals 24. One such commonly used seal is a brush seal.

Figure 5:
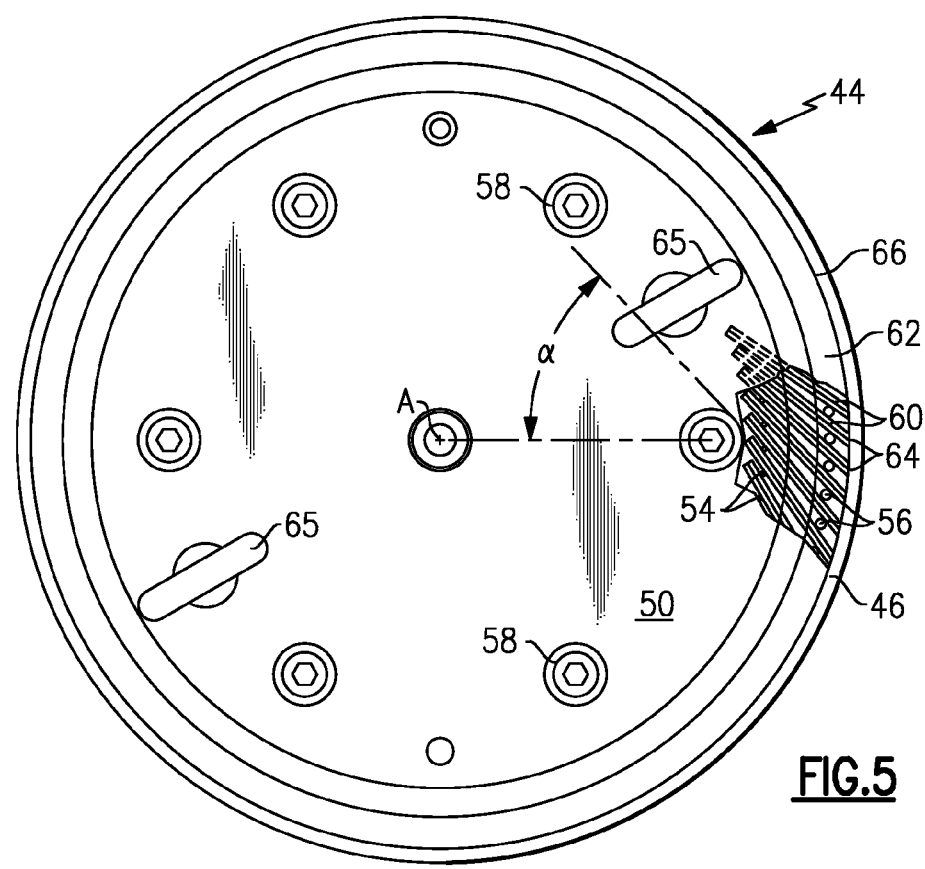
FIG. 5 is a top elevational view of the fixture and shuttle shown in FIG. 4.
Figure 2:
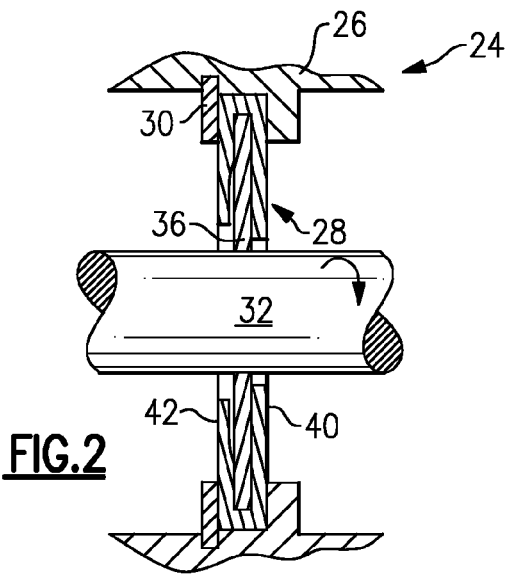
FIG. 2 is a schematic, cross-sectional view of an example brush seal assembly.

Referring to FIG. 2, a brush seal assembly 28 is housed within a carrier 26 and retained relative thereto by a retainer 30 and a shoulder of the carrier. The brush seal assembly 28 seals against a rotating member 32. The brush seal assembly 28 includes bristles 36 circumferentially arranged about an axis A (FIG. 5). First and second plates 40, 42 are secured about the bristles 36 to provide the brush seal assembly 28. In the example brush seal manufacturing process, the bristles 36 are not secured to one another to provide a bristle assembly or hoop before securing the bristles to the plates 40, 42. Instead, the bristles 36 are secured directly to at least one plate 40, 42.

A fixture 44 is used to secure bristles 60 and plate 62 to one another in a desired diametrical and angular orientation so that they can be welded together. Referring to FIGS. 3-6, a base 48 is temporarily positioned in a shuttle 46. The base 48 includes inner guides 54 that provide first bristle alignment features. An inner diameter surface 67 of the shuttle 46 provides a second bristle alignment feature. The shuttle 46 includes outer guides 56 that provide third bristle alignment features. The bristles 60 are supported on a bottom wall 52 of the base 48. The guides 54, 56 locate the bristles 60 in a desired orientation relative to one another as they are circumferentially spaced about the axis A, best shown in FIG. 5.

Figure 7:
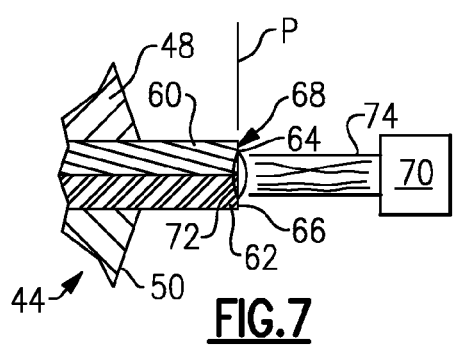
FIG. 7 is an enlarged cross-sectional view of the bristles and plate during welding.

Outer ends of the bristles 60 provide an edge 64. In one example, the edges 64 of the bristles 60 are arranged to abut an inner diameter surface 67 of the shuttle 46. A plate 62 is arranged adjacent the bristles 60 such that the plate 62 and bristles 64 are in engagement with one another. The plate 62 includes a periphery or perimeter edge 66 that also abuts the inner diameter surface 67 of the shuttle 46. As a result, the edges 64 of the bristles 60 and the perimeter edge 66 of the plate 62 together provide a flush surface 68. That is, the outer ends (edges 64) of the bristles 60 run true to the outside diameter (perimeter edge 66) of the plate 62. As shown in FIG. 7, the edges 64 and perimeter edge 66 are coplanar at a plane P that is tangential to the periphery of the plate 62. A cover 50 is secured to the base 48 by fasteners 58 to securely retain the bristles 60 and plate 62 relative to one another in the desired position. The fixture 44 is removed from the shuttle 46 using eyebolts 65, for example.

Figure 6:
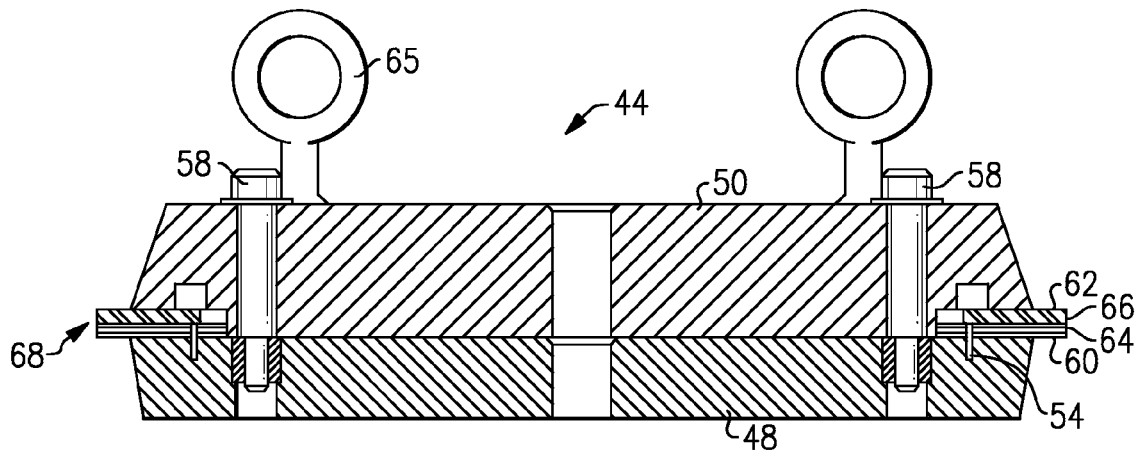
FIG. 6 is a cross-sectional view of the fixture removed from the shuttle.

With the fixture 44 removed from the shuttle 46, the flush surface 68 is exposed, as shown in FIGS. 6 and 7. The bristles 60 are welded to the plate 62 using a welder 70. In one example, the welder 70 is a laser welder that generates a weld bead 72 securing the bristles 60 to the plate 62 with a laser beam 74. The weld bead 72 generated with the laser welder is more precise and much smaller than a tig generated weld bead, thus requiring less machining.

Figure 8:
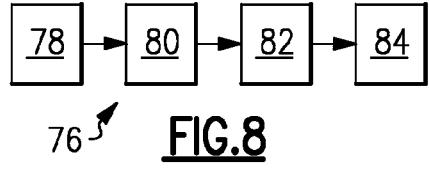
FIG. 8 is a schematic view of an example brush seal manufacturing process.

The example brush seal manufacturing method 76 is schematically shown in FIG. 8. The method 76 includes aligning the bristles 60 and plate 62 to provide a flush surface 68, as described above, as schematically indicated at block 78. The bristles 60 are welded to the plate 62, as indicated at block 80. If desired, multiple bristle and plate subassemblies can be arranged one on top of another to provide a multi-layered brush seal, as indicated at block 82. After welding, the brush seal assembly is machined at its periphery to achieve desired surface features and dimensions at the weld bead 72, as indicated at block 84.

Although example embodiments have been disclosed, a worker of ordinary skill in this art would recognize that certain modifications would come within the scope of the claims. For that reason, the following claims should be studied to determine their true scope and content.

What is claimed is:

1. A welding system with a brush seal welding fixture, the welding system comprising:
 a base having first bristle alignment features;
 a shuttle configured to receive the base, the shuttle having second bristle alignment features;
 a cover secured to the base and configured to retain bristles and a brush seal plate in engagement with one another in a desired orientation, which includes providing a flush surface between the bristles and the brush seal plate; and
 a laser welder arranged in proximity to the bristles and plate configured to weld the bristles and plate to one another at the flush surface.

2. A brush seal welding fixture comprising:
 a base having first bristle alignment features;
 a shuttle configured to receive the base, the shuttle having second bristle alignment features wherein the second bristle alignment features comprise an inner diameter surface configured to diametrically align the bristles to the plate; and
 a cover secured to the base and configured to retain bristles and a brush seal plate in engagement with one another in a desired orientation, which includes providing a flush surface between the bristles and the brush seal plate.

3. The fixture according to claim 2, wherein the inner diameter surface aligns the plate and the bristles in the desired orientation.

4. The fixture according to claim 2, wherein the plate is generally annular in shape, and the bristles are arranged in engagement axially relative to the plate.

5. The fixture according to claim 4, comprising fasteners clamping the base and cover to one another to retain the bristles and plate in engagement with one another.

6. The fixture according to claim 2, wherein the first bristle alignment features include guide pins extending from a bottom wall of the base.

7. The fixture according to claim 2, wherein the shuttle comprises a third bristle alignment features are configured to position the bristles in the desired orientation.

8. The fixture according to claim 7, wherein the third bristle alignment features comprise guides arranged between the bristles.

* * * * *